United States Patent
Flückiger

(10) Patent No.: US 12,515,269 B2
(45) Date of Patent: Jan. 6, 2026

(54) WHIRLING TOOL

(71) Applicant: HM Process Technology AG, Grenchen (CH)

(72) Inventor: Hugo Flückiger, Derendingen (CH)

(73) Assignee: HM Process Technology AG (CH)

( * ) Notice: Subject to any disclaimer, the term of this patent is extended or adjusted under 35 U.S.C. 154(b) by 441 days.

(21) Appl. No.: 17/872,232

(22) Filed: Jul. 25, 2022

(65) Prior Publication Data

US 2023/0041729 A1     Feb. 9, 2023

(30) Foreign Application Priority Data

Aug. 3, 2021 (EP) .................................. 21189339

(51) Int. Cl.
| | | |
|---|---|---|
| *B23C 3/32* | (2006.01) | |
| *B23C 5/22* | (2006.01) | |
| *B23G 5/18* | (2006.01) | |

(52) U.S. Cl.
CPC ............ *B23G 5/18* (2013.01); *B23C 2220/68* (2013.01); *B23G 2240/60* (2013.01); *Y10T 407/1906* (2015.01)

(58) Field of Classification Search
CPC ......... B23C 3/32; B23C 2220/68; B23G 5/18; B23G 1/12; B23G 2240/12; B23G 2240/60; B23G 1/34; Y10T 409/307784; Y10T 409/307616; Y10T 409/30784
USPC .................. 409/65, 75, 76, 77, 78
See application file for complete search history.

(56) References Cited

U.S. PATENT DOCUMENTS

| | | | | |
|---|---|---|---|---|
| 1,237,516 | A * | 8/1917 | Holden ..................... | B23G 5/18 407/24 |
| 1,507,235 | A * | 9/1924 | Hall ......................... | B23G 1/32 82/17 |
| 2,332,510 | A * | 10/1943 | Franzen .................... | B24B 3/04 451/220 |
| 3,209,652 | A * | 10/1965 | Burgsmueller .......... | B23G 1/32 409/74 |
| 4,325,664 | A * | 4/1982 | Mori ....................... | B23C 5/2278 409/234 |
| 6,706,127 | B1 * | 3/2004 | Duggirala ............... | B23P 15/00 148/587 |
| 6,877,934 | B2 * | 4/2005 | Gainer ..................... | B23G 1/34 409/113 |

(Continued)

FOREIGN PATENT DOCUMENTS

| | | |
|---|---|---|
| DE | 29 45 611 A1 | 10/1980 |
| DE | 3831046 A1 * | 3/1990 |

(Continued)

OTHER PUBLICATIONS

Translation of DE 3831046, LEEB, Hollow Milling Cutter for Producing Circular Recesses of Infinitely Variable Diameter, Mar. 15, 1990, pp. 8 (Year: 1990).*

(Continued)

*Primary Examiner* — Nicole N Ramos
(74) *Attorney, Agent, or Firm* — OSTROLENK FABER LLP

(57) ABSTRACT

A whirling tool (21), in particular for cutting a thread, includes a body with cutting teeth integrally machined thereon (23; 47, 51). Inaccuracies caused by mounting cutting teeth on the tool are avoided thereby.

13 Claims, 6 Drawing Sheets

(56) References Cited

U.S. PATENT DOCUMENTS

| | | | | |
|---|---|---|---|---|
| 2001/0018010 | A1* | 8/2001 | Kichin | B23G 5/18 407/24 |
| 2006/0053919 | A1* | 3/2006 | Siler | F16H 25/2223 74/424.71 |
| 2006/0225549 | A1 | 10/2006 | Borzym | |
| 2008/0069648 | A1* | 3/2008 | Macario | B23G 5/18 407/33 |
| 2008/0131224 | A1* | 6/2008 | Vouillamoz | B23G 1/34 470/10 |
| 2010/0021254 | A1* | 1/2010 | Jenkins | B21D 15/04 72/70 |
| 2011/0150591 | A1 | 6/2011 | Jansen | |
| 2012/0264528 | A1* | 10/2012 | Isobe | B23G 9/001 470/9 |
| 2014/0318330 | A1* | 10/2014 | Rigolone | B23B 5/46 82/130 |
| 2018/0193934 | A1* | 7/2018 | Wagner | B23G 5/18 |
| 2019/0184477 | A1* | 6/2019 | Berchtold | B23G 1/22 |
| 2020/0238391 | A1* | 7/2020 | Kannwischer | B23G 1/34 |

FOREIGN PATENT DOCUMENTS

| | | | | |
|---|---|---|---|---|
| DE | 100 20 111 A1 | 10/2001 | | |
| DE | 202017107633 U1 | 3/2019 | | |
| EP | 1 769 870 A1 | 4/2007 | | |
| EP | 3944924 A1 * | 2/2022 | | B23Q 3/069 |
| GB | 115 357 A | 5/1918 | | |
| KR | 100590212 B1 * | 6/2006 | | |
| WO | WO 2007/007097 A1 | 1/2007 | | |

OTHER PUBLICATIONS

European Search Report, dated Feb. 21, 2022, issued in corresponding European Patent Application No. EP 21 18 9339.

* cited by examiner

WHIRLING TOOL

CROSS-REFERENCE TO RELATED APPLICATIONS

The present application claims priority to European Patent Application No. EP 21189339.1, filed Aug. 3, 2021, the disclosure of which is incorporated by this reference.

FIELD OF THE INVENTION

The present invention relates to a whirling tool and a manufacturing method of the whirling tool.

BACKGROUND

Thread whirling, patented by Burgsmüller in 1943, is a well-known manufacturing process according to the state of the art:
Workshop books for engineers, designers and students, Springer-Verlag Berlin Heidelberg GmbH 1969 Editors H. Determann, W. Malmberg, H. Rattay
W. Langsdorff Thread production and manufacture of screws, Chapter V: Whirling of threads
Offprint from the technical review No. 40/73 of Sep. 14, 1973, F. Bertram Thread whirling, or peeling, is used to produce threads or contours that require precise geometry and accuracy. According to the state of the art in thread whirling, several inserts or tools mounted in a whirling head run eccentrically around the workpiece on a flight circle. In thread whirling, the whirling head is swiveled to the workpiece by the thread pitch angle. In addition, the workpiece rotates slowly in the longitudinal direction around its own axis in synchronism to produce the thread pitch or feed.

It is known that achieving long tool life and efficient chip removal rates is significantly influenced by the concentricity of the cutting edges, i.e., by the coaxiality of the entire system (spindle, tool holder, tool cutting edges, targeted cooling, etc.).

It is also known that there are cutting machining processes that have tools with integrated internal cutting teeth. This includes, among other things, threading with dies. A threading die is cylindrical in shape and has three or more cutting edges inside, depending on its size. On the outer surface of the cylinder are three or four conical recesses in which the die can be secured against rotation by means of screws in a suitable holder.

Tools with integral internal cutting teeth are also described in the following patent specifications:
US 2006/0225549 A1 of Oct. 12, 2006, Sawing with a circular saw blade with internal teeth
GB 115357 A of Aug. 30, 1917, Improvements for thread cutting or thread milling.

In addition to the internal cutting teeth, all the above-mentioned tools do not have an integral form- and force joint in the tool itself.

All solutions known according to the state of the art are not adapter-free. They require screws, pins, insert carriers, etc. to connect them to the drive.

Thread whirling or peeling is not comparable to sawing with a circular saw blade with internal teeth (patent US 2006/0225549 A1).

The difference is in the motion sequence. The circular saw blade with internal teeth moves eccentrically around the clamped profile.

The whirling tool also rotates eccentrically around the workpiece as described above. In addition, however, the workpiece also rotates around its own axis and with feed in the longitudinal direction, to produce the thread pitch.

Furthermore, the cutting teeth must fulfill several subsequent functions during whirling:
Deep cutting
Profile cutting of the two flanks
Deburring of the profile tip
Ensuring high geometrical accuracy and surface quality
Parallelization of roughing contours, for example for the head geometry of screws FIG. 1 schematically shows a whirling tool 1 according to the state of the art. It consists of several parts:
(a) depending on the situation, at least 6 individual indexable inserts 3, each screwed to a cutting insert carrier 5 and having three contact surfaces 7,
b) the insert carrier 5; and
c) a base holder 9 or a whirling head.
d) This basic holder 9 or whirling head is joined and centered in the hollow shaft spindle (not shown) of the machine tool, either with a conical thread and a face contact or with a conical face contact with a cylindrical collar and clamping screws. Driving pins 13, which are inserted in corresponding holes 14 in the basic holder 9 and the insert carrier 5, transmit the rotary motion from the basic holder 9 to the insert carrier 5. A cover ring 15 is fastened to the cutting insert carrier 5 with screws 17, which secures the union nut 11 against loosening.

In another known embodiment, the cutting insert carrier 5, designed in taper-plan form with a cylindrical collar in which the cutting inserts 3 are fastened, is inserted into the whirling shaft in a form-joint and force-joint manner by means of screws.

All whirling tools therefore have at least 4 joints:
1. insert-insert carrier,
2. insert carrier-whirling head,
3. whirling head-hollow shaft spindle,
4. hollow shaft spindle-spindle bearing.

This multiplicity of joints makes it difficult to maintain high-precision concentricity and high tool change accuracy. The goal would be concentricity and changeover accuracy with minimal deviations. The aim is to have concentricity deviations of no more than 0.003 mm (3 microns) and changeover accuracy of no more than 0.002 millimeters (2 microns). This problem arises in the thread whirling of bone screws. In contrast to the turning process, thread whirling does not produce a round profile, but a profile with many corners. The increase in the number of corners is mainly influenced by the geometric deviations mentioned above. Perfect geometries and a high surface quality without visible polygon facets are required for bone screws or spindles.

The cutting inserts 3 are manufactured with grinding machines or with combined laser-grinding machines in several setups. The cutting insert carriers and whirling heads are manufactured according to the state of the art using separating machining processes (turning, milling, grinding, etc.).

Based on the current state of the art, whirling still uses a cooling medium for cooling during the process. For the supply of the fluid to the cutting inserts, reference should be made here to the utility model specification DE 20 2017 107 633 U1. In this system, the cooling medium cannot be fed directly radially via the spindle drive to the cutting point. Axial, radial, and oblique channels must be drilled in the spindle rotor and in the whirling tool (tool holder, cassette, or ring cassette) to feed it to the chip removal point. In addition, the cooling medium in the insert carrier cannot be directed to the inserts because of the space available (screws/plates). The narrow chip spaces between the inserts, which are not open to the rear, are also problematic.

These difficulties make it impossible to design a chip space that is suitable for dry machining and that is freely accessible. Chips inevitably remain.

Often, the task also arises of reducing the raw material diameter of a workpiece to a certain diameter with a precut before the final diameter or thread can be machined. This precut extends the overall machining time because a portion of the cutting edges of the whirling tool is used for this purpose.

SUMMARY

One object of the present invention is to provide a whirling tool that can be more easily attached to a machine tool with the required accuracy.

Another object is to specify a method for manufacturing such a tool with improved geometrical accuracy (concentricity and coaxiality).

Other optional tasks to be solved are:
Better unification of the end contours and diameters with a preceding diameter reduction.
To allow an automatic tool change.
Improved chip removal.
Improved supply of cooling medium.
Increase of the pitch angle of the threads or spirals to be produced.
Improved use of the tool with consistent quality-ensuring the cutting edges are reshaped.

Such a tool is indicated in claim 1. The further claims indicate preferred embodiments and methods of making the whirling tool.

In a preferred embodiment, the whirling tool is designed to produce an external thread on a circular cylindrical section of a workpiece, preferably a section with a diameter of at most 0.2 m, at most 0.01 m, at most 0.005 m, at most 0.0035 m or at most 0.001 m with increasing preference.

The whirling tool may be peripherally conically shaped so that the whirling tool can be held centered in a receptacle of a machine tool.

The carrier section may have at least one thread-like locking groove on the outer circumference, so that the whirling tool can be fastened by screwing in a receptacle of a machine tool which is equipped with counterparts for the thread-like locking grooves.

Three thread-like locking grooves may be provided, for example.

In the case of more than one thread-like locking groove, the thread-like locking grooves do not overlap, preferably each assuming at most an angle of 75% of 360° divided by the number of thread-like locking grooves.

The pitch of the thread-like locking grooves may be identical and per full revolution (360°) may be at most 10 mm, preferably at most 8 mm and further preferably about 6 mm.

The whirling tool may have cooling channels near the cutting edges, so that these can be supplied with an operating medium, in particular a lubricant or coolant, via the channels.

BRIEF DESCRIPTION OF THE FIGURES

The invention is further explained by preferred embodiments with reference to Figures.

DETAILED DESCRIPTION

Figure 1:
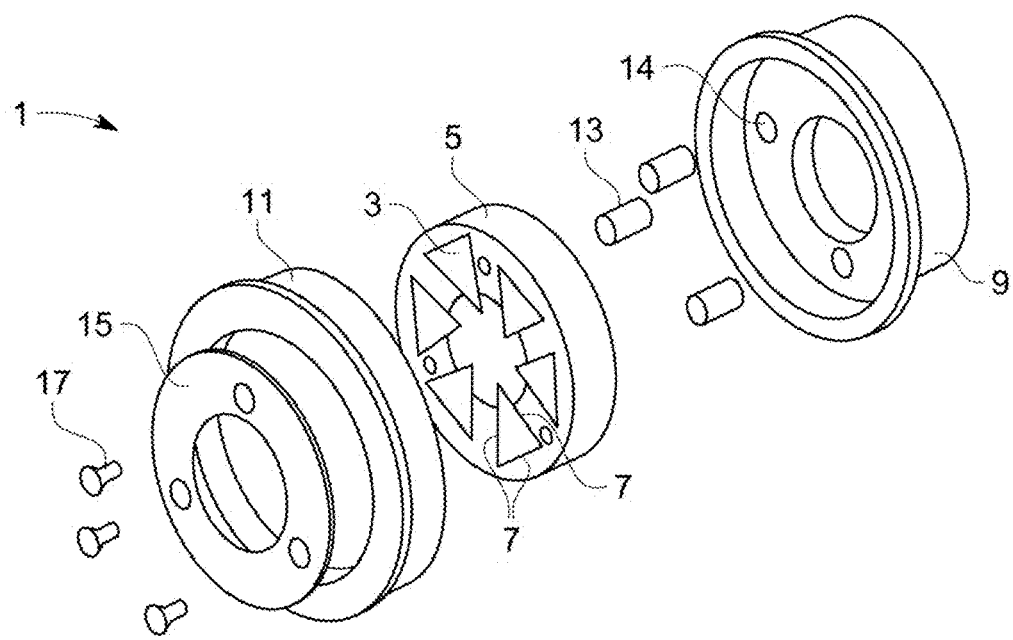
FIG. 1 shows a schematic exploded view of a whirling tool according to the state of the art as explained at the beginning.
Figure 2:
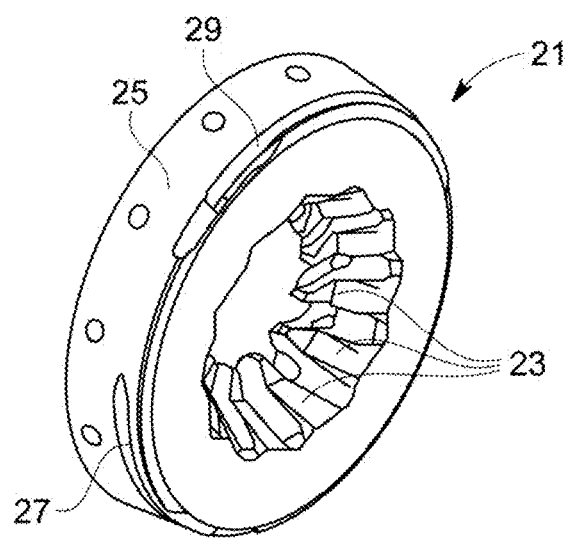
FIG. 2 is an isometric representation of a whirling tool.
Figure 3:
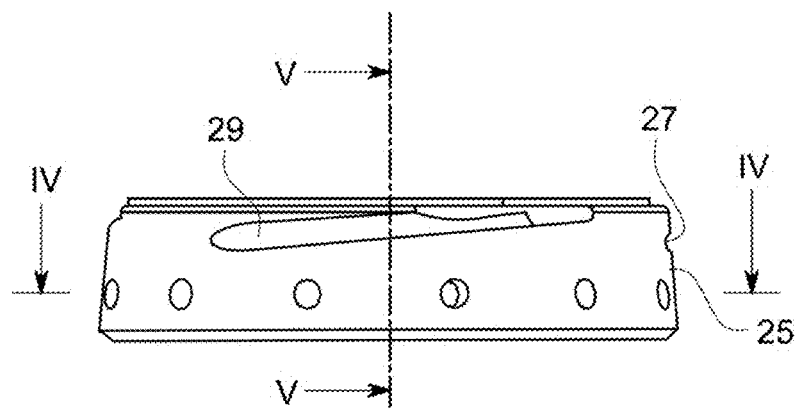
FIG. 3 is a side view of the whirling tool according to FIG. 2.

The inventor has found a way to design the whirling tool as a one-piece whirling tool 21. The one-piece design is based on the idea of eliminating or at least significantly reducing the sum of joint tolerance clearance by directly receiving and positioning the monobloc whirling tool in the drive shaft.

The monobloc whirling tool 21 includes a plurality of internal cutting teeth 23 and, on the outer geometry, a tapered centering and interface mechanism 25 with three-point contact 27 for direct manual or automatic change of the tool in the tool spindle.

The positive and non-positive locking of the one-piece whirling tool 21 with the drive spindle of a machine tool or processing machine is realized by a type of conical lock 29 with a rotary locking of approximately 25° to 60° and with a 3 common thread-like locking groove (similar to a bayonet lock) at a pitch angle of approximately 6 mm/360 degrees With this arrangement of the inclined groove segments in the drive spindle, the fit whirling tool 21/drive spindle is simultaneously radially and axially sealed.

According to the state of the art, there are no whirling tools or whirling systems that can fulfill the functions of an automatically exchangeable whirling tool with direct coupling of the cooling media. The tool invention for whirling and peeling an integral solution, which contains the cutting teeth as well as the precise form and force locking joint in a monobloc. Thus, the goal of precise repeatability of the coaxiality is achieved with a manual, as well as with automatic tool change.

The improvement of the technology consists of the linking of the tool clamping with a three-point force closure, the centering with a cone and the cutting in a single tool.

The automatic change of the monobloc whirling tool can be realized with a pick-up changer, depending on the type of machine tool. In this process, the one-piece whirling tool is placed in or picked up from the tool magazine in the direction of the spindle C axis and the infeed stroke. Via the conical interface and 3 locking grooves, the whirling tool is positioned radially and axially without clearance. The conical interface with 3 thread-like locking grooves bridges small manufacturing and wear tolerances. With the spindle as C-axis, the whirling tool is fixed with a defined tightening torque. The feed stroke as Z-axis is preferably pneumatic and compliant for facilitated screw-in movement and positioning. In the tool magazine, the whirling tools are secured against rotation and held axially by permanent magnets. A high, abrupt torque is required at the spindle to loosen the interface. Manual assembly and disassembly with a torque wrench is also possible.

With the appropriate machine configuration, the monobloc whirling tool can also be used for medium and finer peeling operations for diameter reduction of bone nails, shafts, axles, etc., with different geometries. With coordinated geometric designs of the cutting teeth, it is possible to achieve optimum cutting work and time chip volume with chip breaking.

In the case of the monobloc whirling tool, generally consisting of carbide (hard metal), cutting teeth alternatively made of PCD, CVD and/or CBN can also be brazed into the tool. In this case, the required cutting geometry must be precisely machined with ultrashort pulse lasers. This means that even high-hardness materials such as ceramics can be machined.

Figures 5A, 5B:
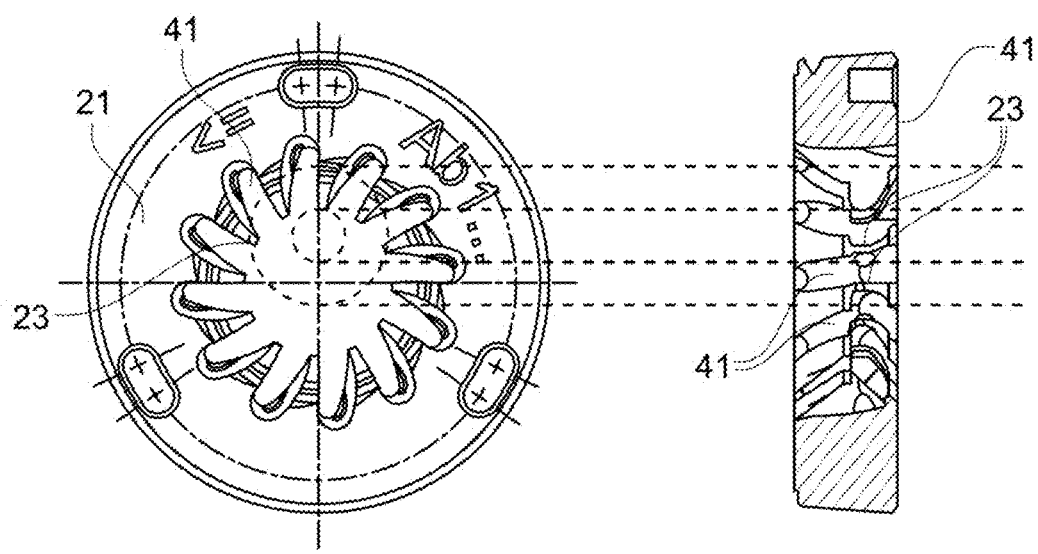
FIG. 5A is a top view of the whirling tool.
FIG. 5B is a sectional view along line V-V in FIG. 3.

Furthermore, if necessary, the tool can be coated with a layer adapted to the machining task to increase wear resistance. New carbide machining capabilities with multi-tooth PCD/CVD and CBN tools (polycrystalline diamond, high-purity diamond, or cubic boron nitride) and laser-conditioned cutting teeth make it possible to manufacture the tool in one-setup, including the cutting edges, the flutes, and the outer geometry of the interface, as shown in FIG. 5A.

Preferably, the Monobloc whirling tool is manufactured with PCD or CVD cutters from a carbide blank to machine the chip and rake angle.

Figure 6A:
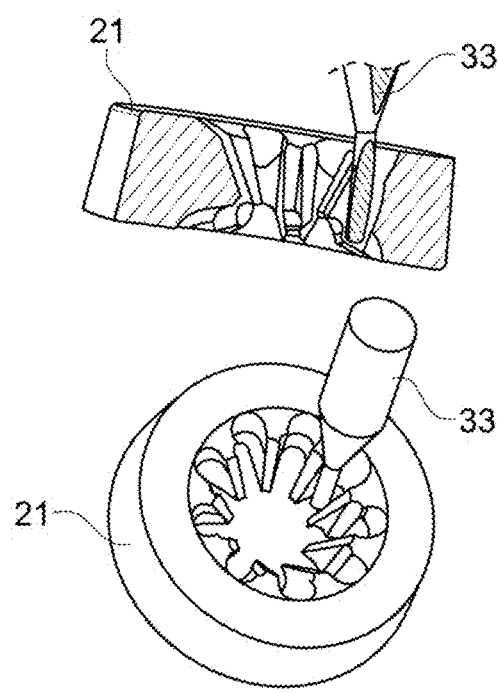
FIGS. 6A-6C illustrate the manufacture of the cutting teeth of the whirling tool.
Figure 6B:
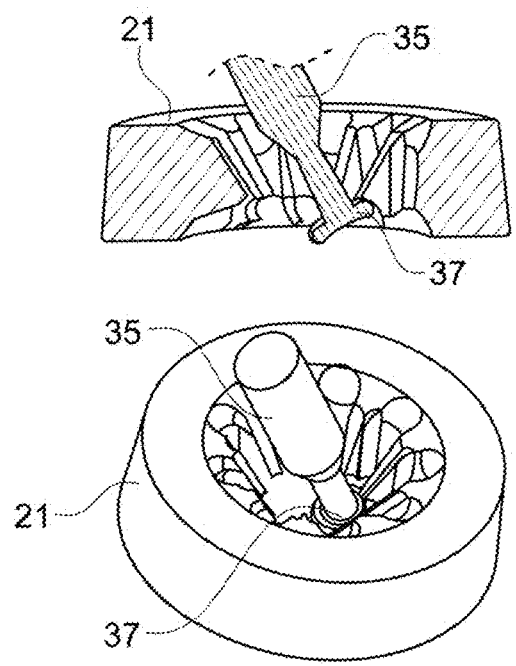
Figure 6C:
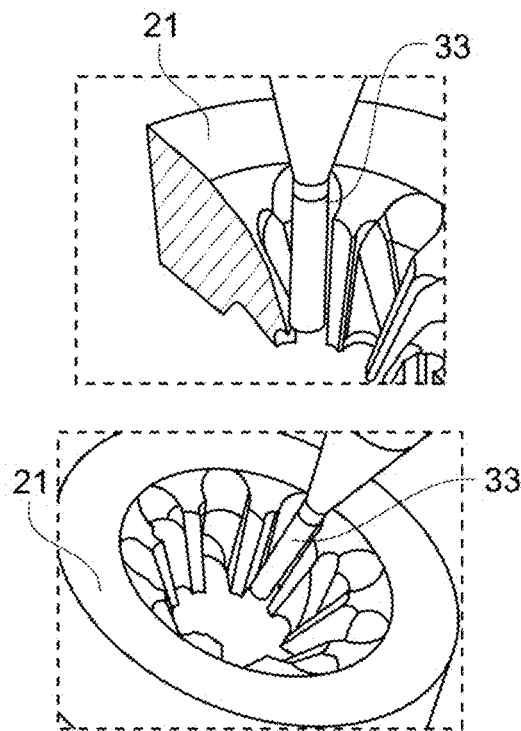

FIG. 6A illustrates the production of the rake angle of the cutting edge by means of a cylindrical milling cutter 33. The clearance angle is produced by means of a milling tool 35 with undercut 37 FIG. 6B.

The advantage is that the chip geometry of the cutting teeth, as well as the external geometry, can be produced in the cross of the A and B axes (without using the X and Y axes and their positional and drag errors) with a precise 5-axis CNC machine. All these advantages resulting from the monobloc whirling tool bring improved quality in terms of congruence of the tool and spindle axes and concentricity of the cutting teeth.

A recognizable positive feature of monobloc whirling tool solution is that, in contrast to prior art whirling units, chip flow is not impeded by narrow chip chambers and catch points, additional retaining rings, screw points of the inserts and intermediate flanges.

The rearward radially and axially open design of the chip flutes 41 creates a fan effect for optimum chip outflow, which favors dry machining.

The invention ensures a favorable ratio of the number of cutting teeth, flutes, and whirling circle. In the prior art, existing systems do not provide an optimum variance between the number of cutting teeth, chip flutes and whirling circle with blockage-free chip discharge compared to the one-piece whirling tool.

With the one-piece tool, a closer pitch of the cutting teeth, i.e., more cutting teeth per tool, can be selected. The narrower pitch of the cutting teeth and the rear-opening flutes 41 (see FIGS. 5A and 5B) result in better enveloping circle cuts and thus higher productivity.

According to the current state of the art, the cutting work on multi-bladed whirling tools is carried out with cutting division. Individual cutting edges work as roughing cutters and the finishing cutting edges produce the finished thread flanks, e.g., 9-flute whirling tool with three roughing cutting edges for diameter reduction and six cutting edges for the thread profile.

With the monobloc whirling tool, it is possible, if required, to set the cutting division to two cutting edges per cutting tooth. It is also possible to whirl triple threads by dividing the cutting edges per tooth with corresponding thread profile distortion correction.

When using the monobloc whirling tool 21 for thread whirling, the cut division can therefore be made with laterally distributed tooth clearances. In a departure from the prior art, the tip geometry of all cutting edges of the tool can be used to produce the thread core profile. In this way, a better metal removal rate is achieved. With this concept, therefore, both the axial and the radial cutting force can be distributed over a larger number of cutting edges. The cutting edges for precutting to reduce the diameter of the raw material diameters must also be divided so that, for example, only every second cutting edge is engaged. The axial feed dependent on the selected pitch is only small, the axial tooth feed would be minimal.

Figure 7A:
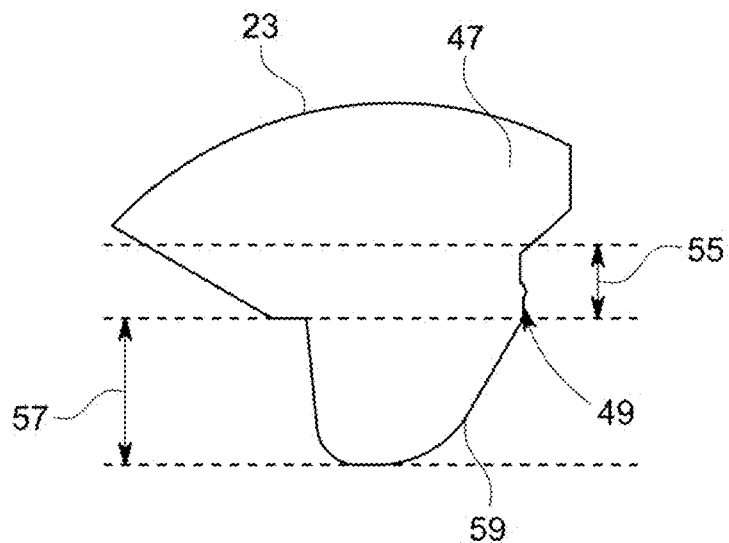
FIGS. 7A and 7B show cutting teeth with axially and radially distributed cutting-edge geometries.
Figure 7B:
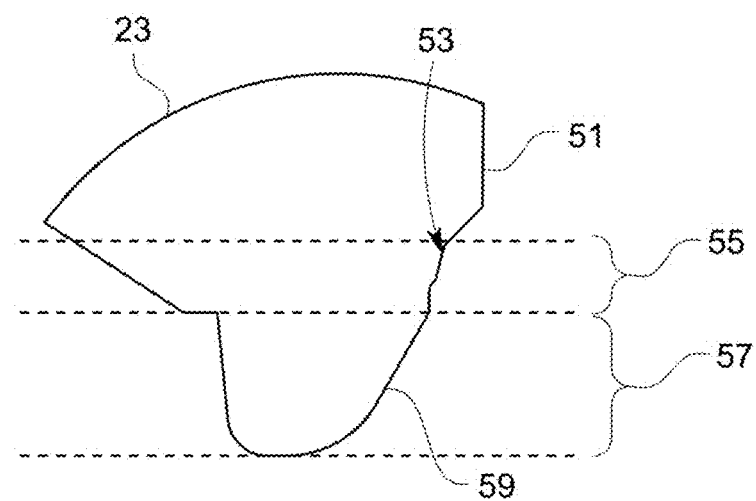

FIGS. 7A and 7B shows two teeth 23, where (FIG. 7A) one tooth 47 has a first inner partial precutting area 49 and (FIG. 7B) the other tooth 51 has a partial precutting area 53 further out. The partial precutting areas 49 and 53 together form the precutting area 55. The actual thread cutting area 57 is formed by the two teeth that identically cover the thread profile 59.

A known solution for performing a diameter reduction is to arrange a turning tool upstream of the whirling tool so that the latter can perform the precut. The whirling tool then only produces the thread. This procedure is known as rotary whirling.

However, the disadvantage of this is that the movement of the whirling tool must be synchronized with the movement of the main spindle, which is necessary for cutting with the turning tool, and this is currently only supported by some machine tool manufacturers. The turning tool must cut continuously, which causes the well-known problems such as high thermal stress on the cutting edge and difficult chip control. Titanium and its alloys are long-chipping materials, as are the stainless-steel alloys commonly used in medical technology; controlled chip breakage during turning is usually not achieved. Overall, this process integration of turning and whirling together has the further consequence that this type of machining is only feasible with a smaller number of cutting edges in the whirling tool.

Compared to rotary whirling, the time savings are far better with the described one-piece whirling tool with precutting areas for diameter reduction. The one-piece whirling tool advantageously produces short chips. The combined cutting-edge geometry prevents interference from chips, which cannot be ruled out with rotary whirling.

When producing threads or screws, etc., the average pitch angle must be considered with corresponding swiveling in of the whirling unit or with distortion compensation of the cutting-edge geometry. For easier integer adjustment of the swivel angle, the deviation can be compensated with a distorted cutting-edge geometry.

With the known whirling units, the adjustable swivel angle has limited adjustment possibilities due to the axial offset of the pivot point towards the chip engagement point.

Figure 8:
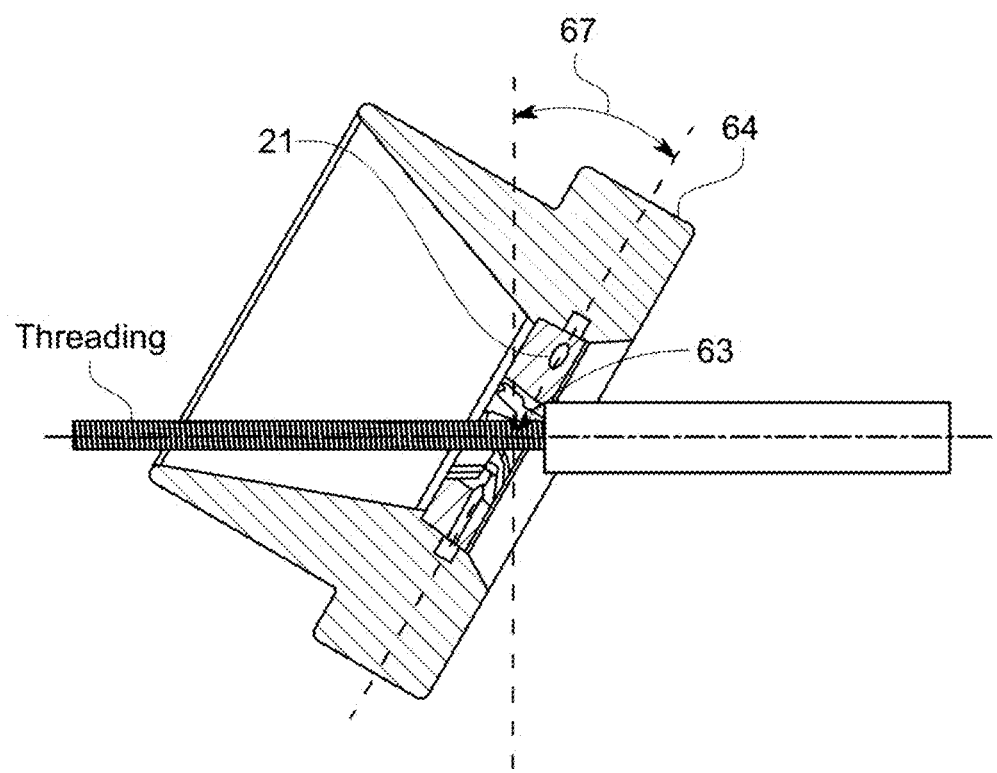
FIG. 8 illustrates a swivel axis.

An arrangement of the monobloc whirling tool 21 with its form and force fit 63 at the center of rotation of the drive spindle 64 extends the range of the adjustable swivel angle 67. This is an advantage for machining spiral grooves, threads (see external thread on a circular cylindrical section of a workpiece in FIG. 8), worms, etc. with large pitches.

Figure 4:
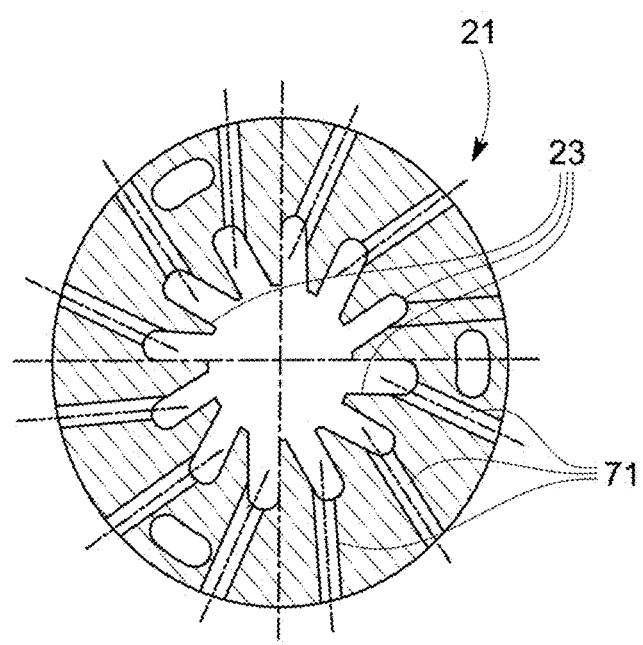
FIG. 4 is a sectional view according to IV-IV in FIG. 3.

As can be seen in FIG. 4, the supply of the cooling medium in the monobloc whirling tool 21 can be designed with a simpler, direct radial supply through radial cooling channels 71 without detour.

The supply takes place radially from the outside. In the transition to the rotating part, there is an annular groove on at least one side (stationary or moving part) which distributes the medium over the circumference so that the cooling channels 71 are continuously supplied with medium.

Another advantage of the design of monobloc whirling tool 21 is the radially and axially open design of the chip flutes 41 towards the rear. This produces a suction effect and thus optimum chip flow both in the dry and wet state.

The effect of this air flow can also be used for dry machining. The low thickness of the monobloc whirling tool enables a direct cooled air flow with closed supply line and closed chip removal from the cutting point.

Since the regrinding of the previously known assembled tool combination of triangular or rhombus plates-plate carrier-hollow spindle, etc. is only feasible with difficulty for technical reasons due to the resulting inaccuracies and complexity, resource conservation of the inserts by reuse is often not applied.

The identical receptacle for the monobloc whirling tool of the device for resharpening with form and force fit as the spindle allows an exact resharpening 2-3 times with an accuracy as in new condition.

With an integral codification marking on the mono bloc whirling tool, all relevant geometric data can also be read by the machine after resharpening and thus be directly calculated with the tool offset From the foregoing description, variations and additions to the invention are available to those skilled in the art without departing from the scope of protection of the invention as defined by the claims. Conceivable is for example:

A connection to internal or external tool databases.

The invention claimed is:

1. A single-piece, monolithic whirling tool for use in a machine tool including a tool spindle, the single-piece, monolithic whirling tool comprising:
   a carrier section configured to be received in the tool spindle; and
   a plurality of internal cutting teeth,
   the carrier section being peripherally conically shaped and including locking grooves on an outer circumference configured to be fastened in the tool spindle, each locking groove being helical,
   wherein the internal cutting teeth and the carrier section together form the single-piece, monolithic whirling tool, and the carrier section annularly surrounds the internal cutting teeth.

2. The single-piece, monolithic whirling tool according to claim 1 wherein the whirling tool is designed to produce an external thread on a circular cylindrical section of a workpiece.

3. The single-piece, monolithic whirling tool according to claim 1 wherein the carrier section is configured to be held centered in the tool spindle of the machine tool.

4. The single-piece, monolithic whirling tool according to claim 1 wherein three locking grooves are provided.

5. The single-piece, monolithic whirling tool according to claim 1 wherein the locking grooves do not overlap.

6. The single-piece, monolithic whirling tool according to claim 5 wherein each locking groove has at most an angle of 270° divided by the number of the locking grooves.

7. The single-piece, monolithic whirling tool according to claim 1 wherein each locking groove has a pitch having an inclination, and wherein the inclinations of the pitches of the locking grooves are the same.

8. The single-piece, monolithic whirling tool according to claim 1 wherein the whirling tool has cooling channels near the cutting teeth to receive operating medium via the cooling channels.

9. The single-piece, monolithic whirling tool according to claim 1 wherein each cutting tooth has at least two cutting edges configured to perform two successive cutting processes.

10. The single-piece, monolithic whirling tool according to claim 1 wherein each locking groove has a pitch that is inclined at least 6 mm per full revolution (360°).

11. The single-piece, monolithic whirling tool according to claim 1 made of carbide.

12. The single-piece, monolithic whirling tool according to claim 2 wherein the circular cylindrical section of the workpiece is in the range of 0.001 m to 0.2 m.

13. The single-piece, monolithic whirling tool according to claim 1, each cutting tooth having exactly two cutting edges configured to perform-two successive cutting processes.

* * * * *